Jan. 24, 1956
D. PEARSON
2,732,056
LOADER-CONVEYOR APPARATUS
Filed Oct. 4, 1952
9 Sheets-Sheet 2
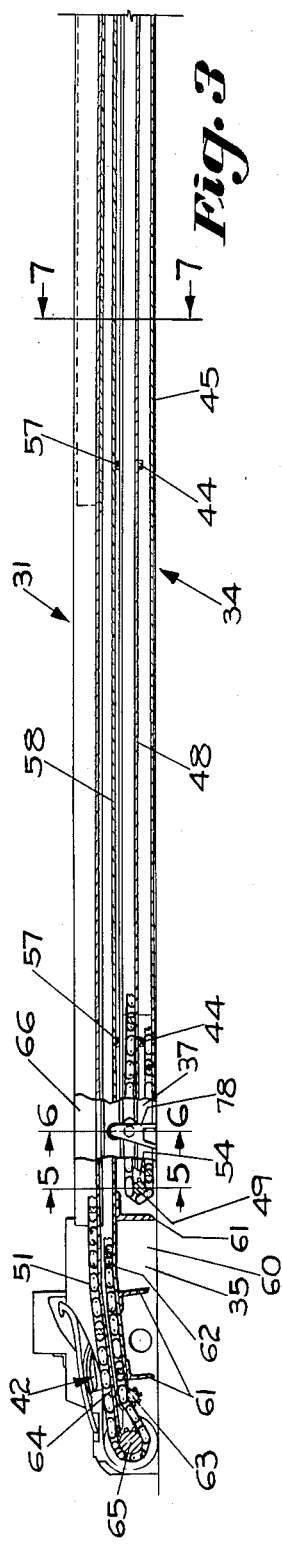
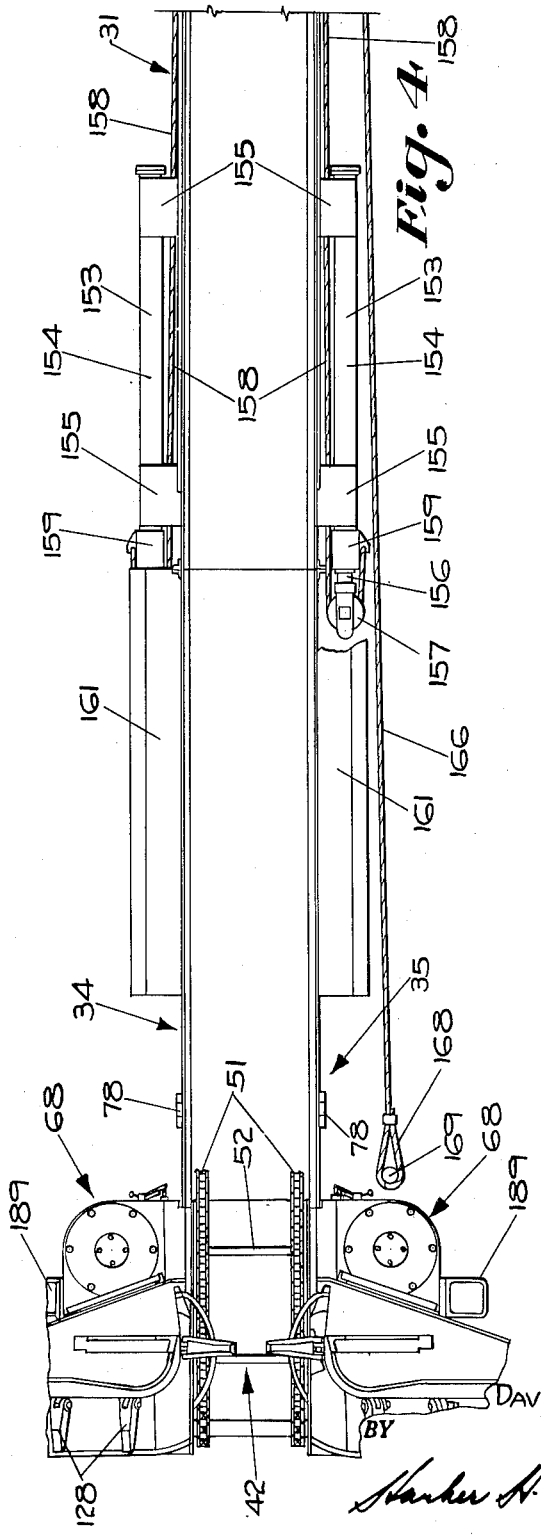
INVENTOR;
DAVID PEARSON,
BY
ATT'Y.

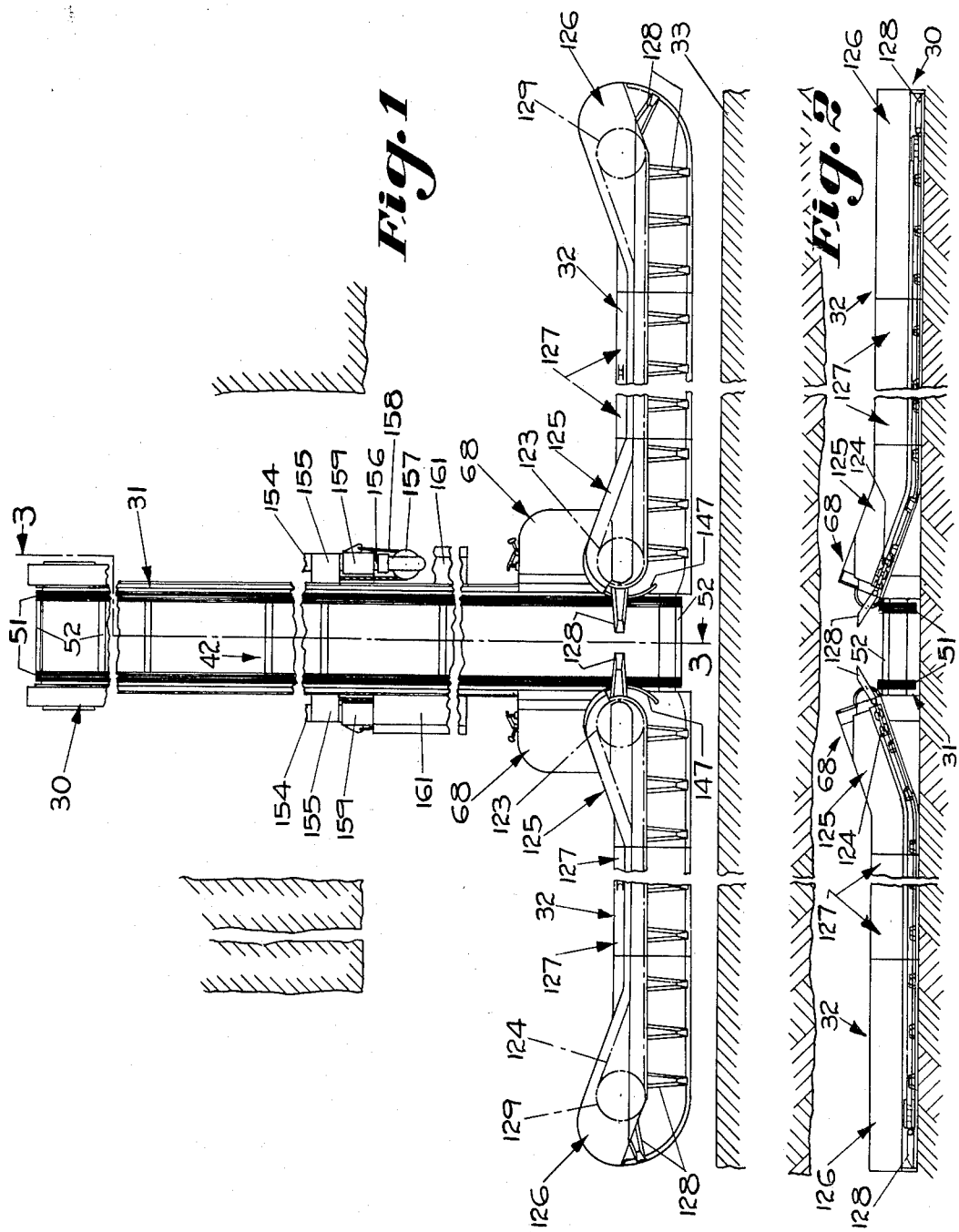

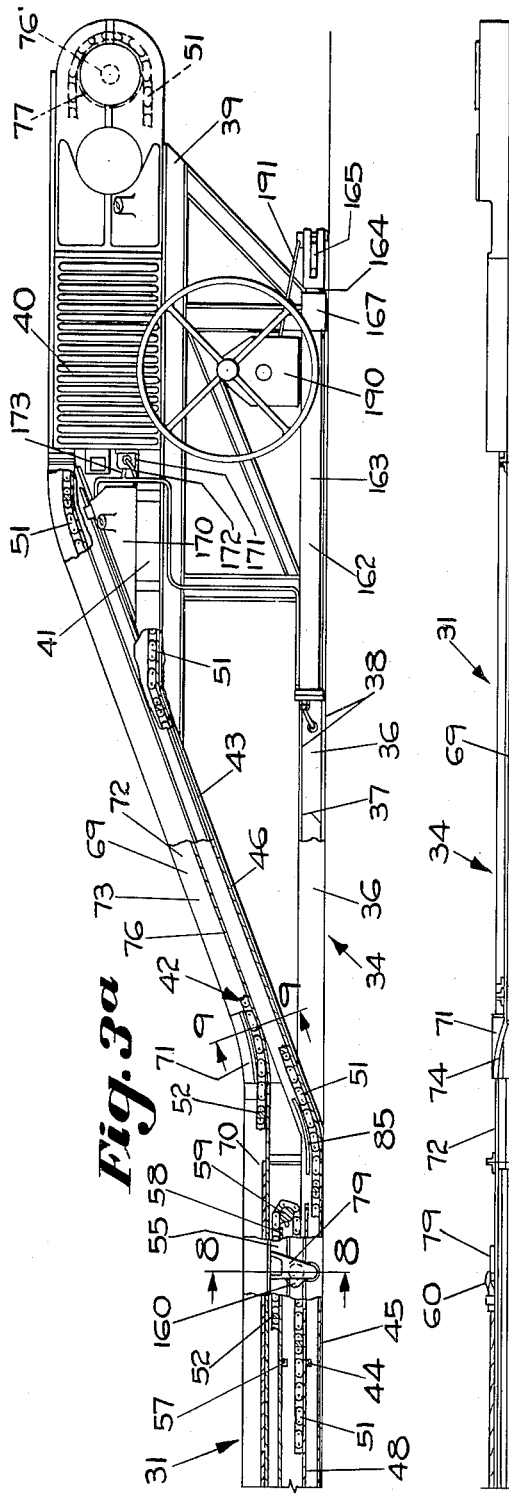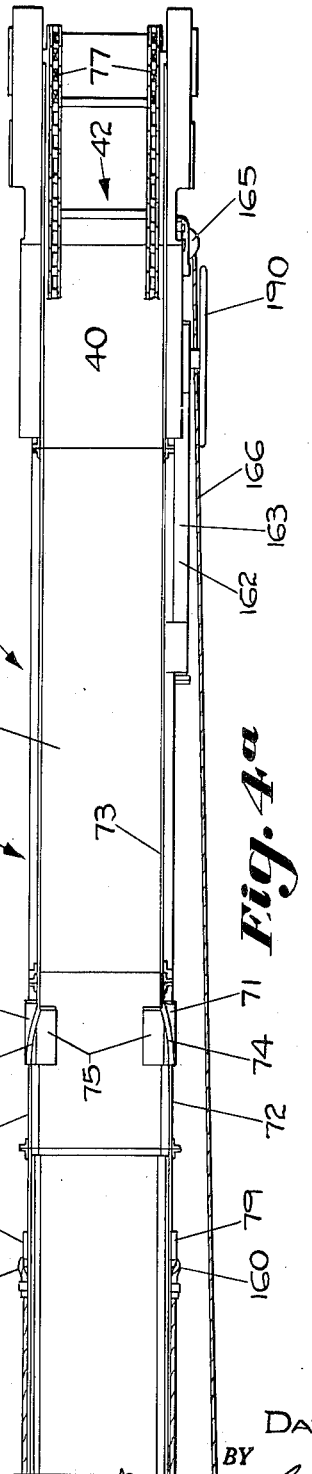

Jan. 24, 1956  D. PEARSON  2,732,056
LOADER-CONVEYOR APPARATUS
Filed Oct. 4, 1952  9 Sheets-Sheet 4
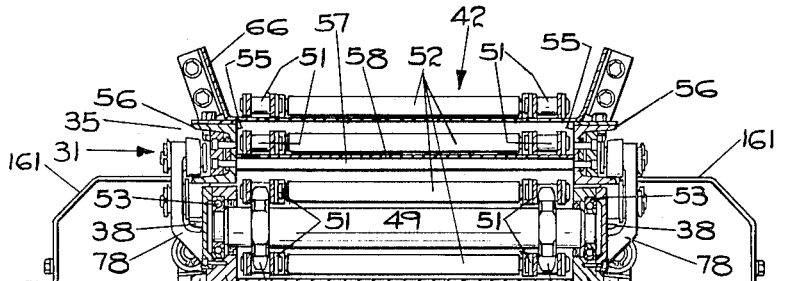
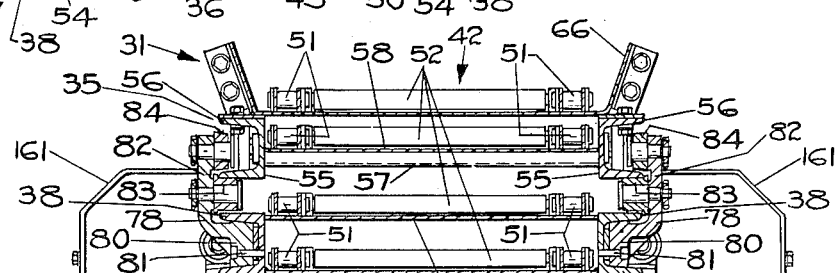
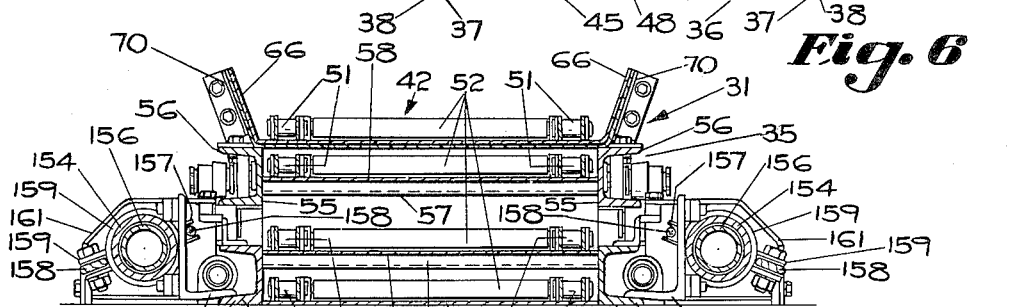
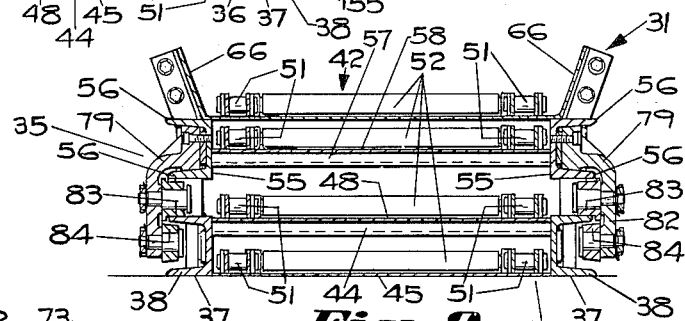
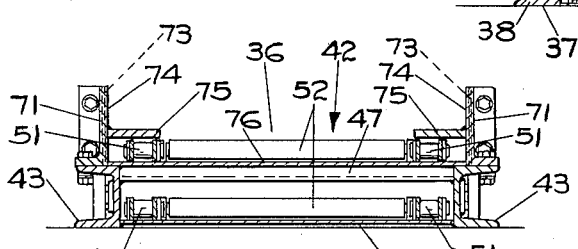
INVENTOR:
DAVID PEARSON,
BY
ATT'Y.

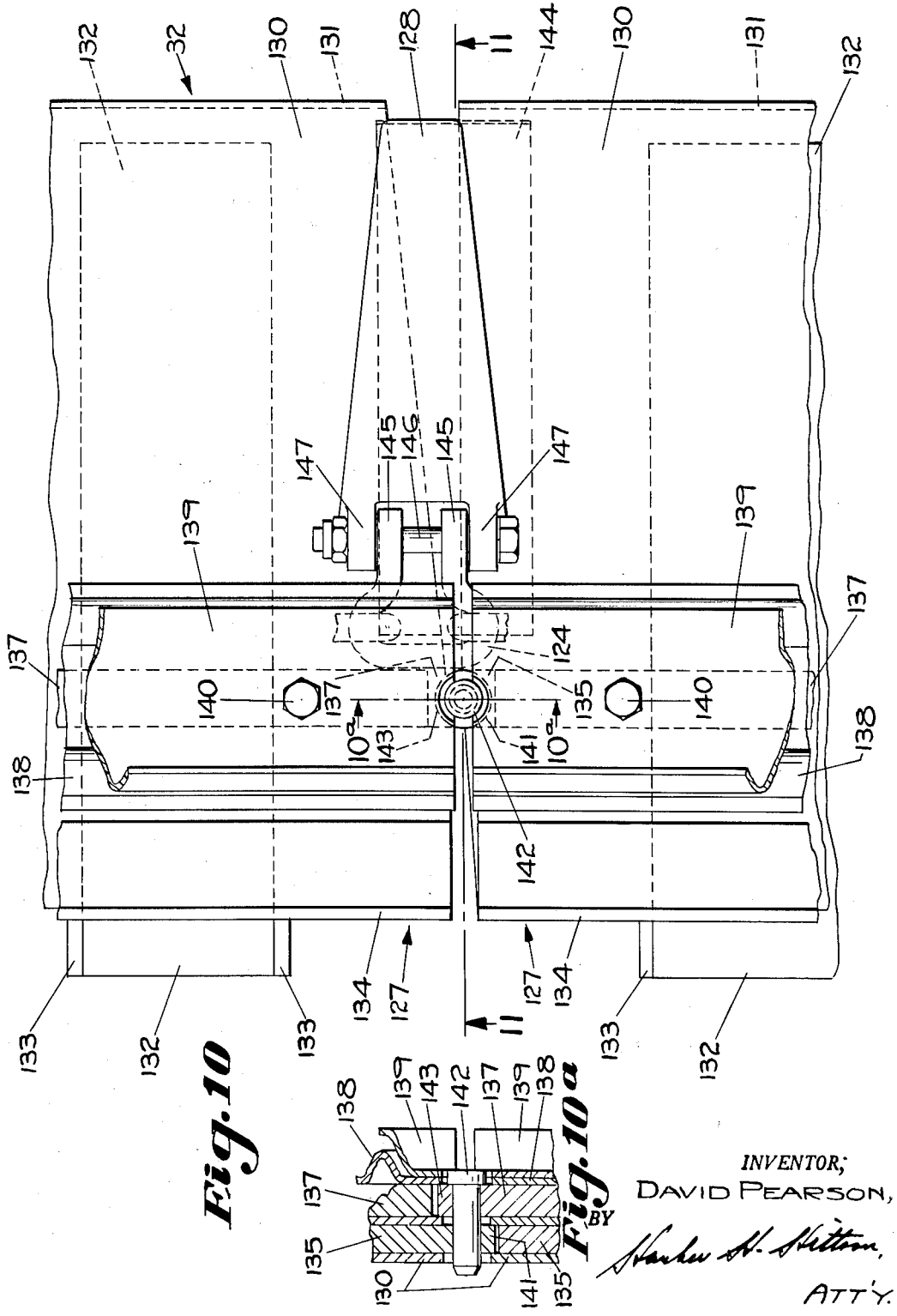

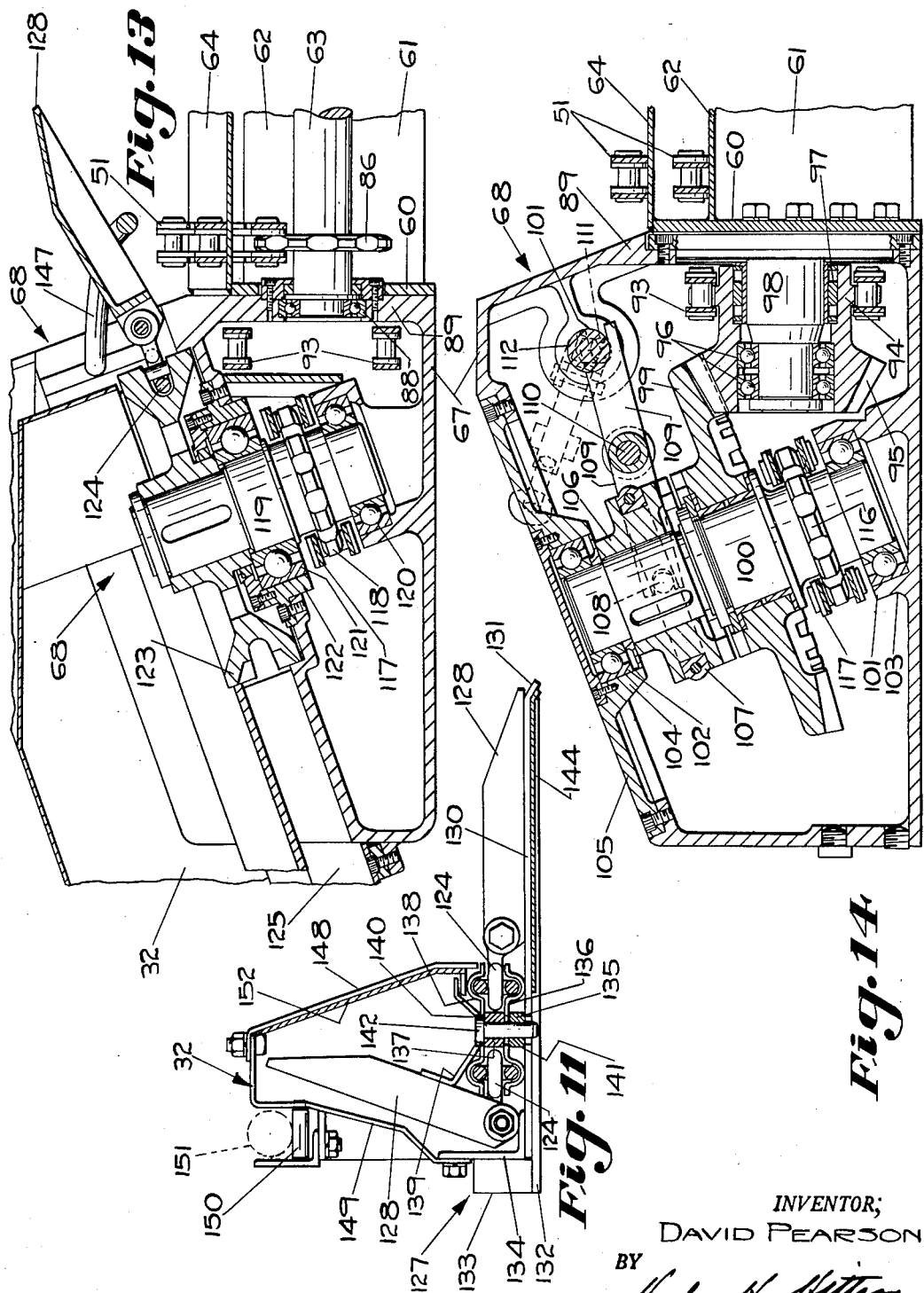

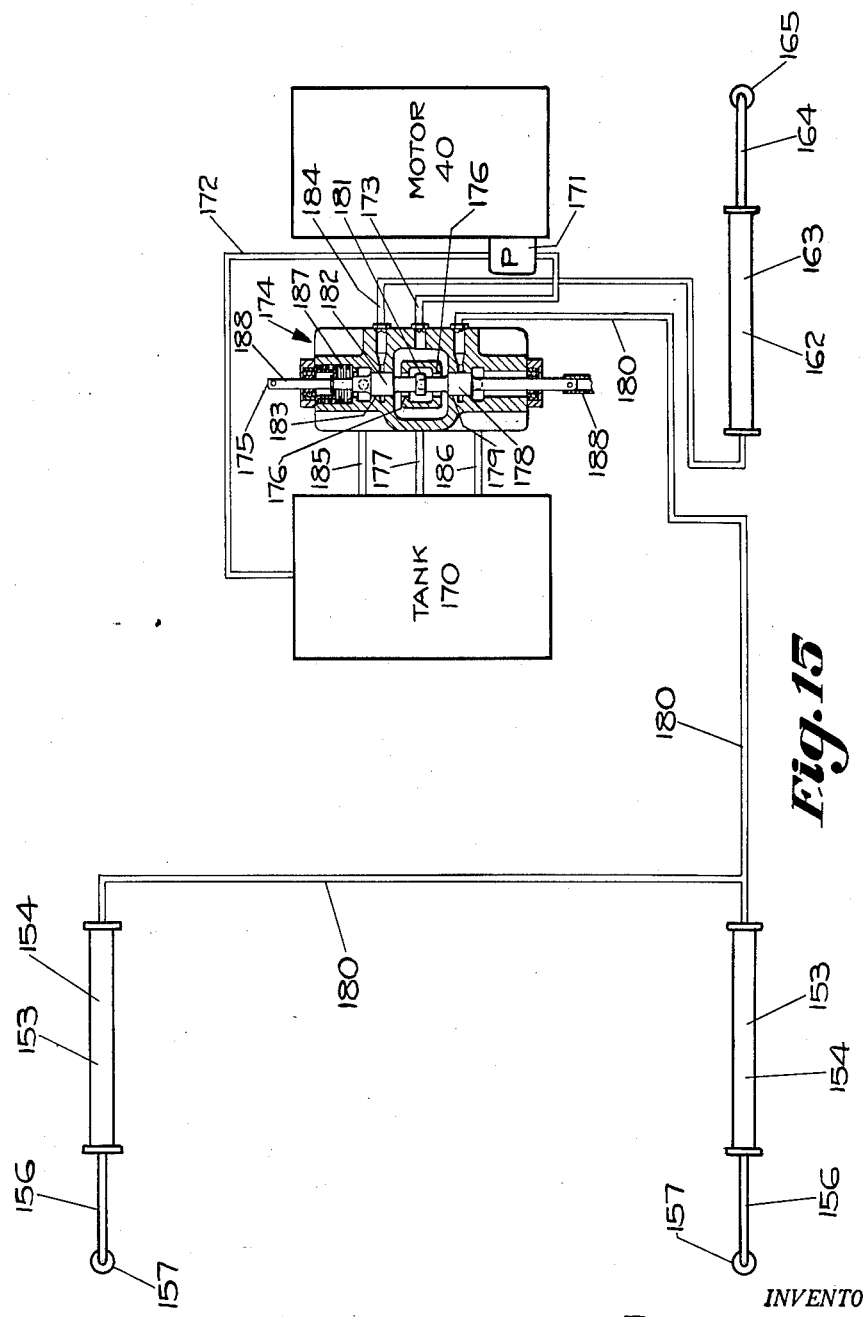

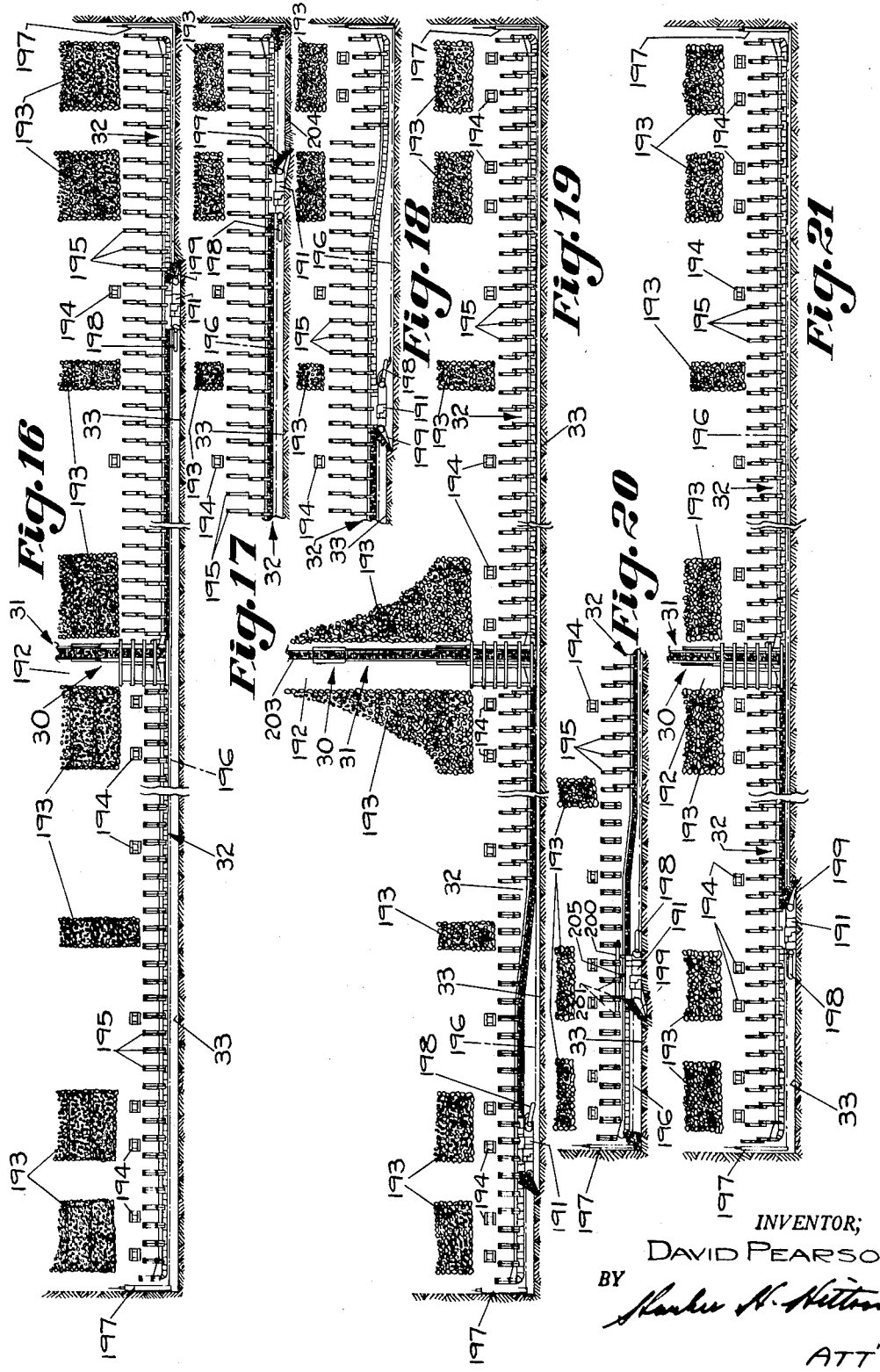

United States Patent Office 2,732,056
Patented Jan. 24, 1956

2,732,056

LOADER-CONVEYOR APPARATUS

David Pearson, Wakefield, England, assignor to The Jeffrey Manufacturing Company, a corporation of Ohio Application October 4, 1952, Serial No. 313,111

2 Claims. (Cl. 198—8)

This invention relates to a gathering and loading conveyer apparatus adapted to gather and load loose material as the conveyer apparatus is advanced toward the material.

In a more specific aspect, the invention relates to a long-wall mine loader-conveyer that is adapted to gather and load loose material removed from a long-wall mine face for example, by a cutting machine traveling along the long-wall mine face, or by drilling and blasting, or by any other suitable means.

One object of the invention is to provide improved loader-conveyer apparatuses of the type above set forth.

Another object of the invention is to provide an improved loader-conveyer apparatus of the type last set forth that includes a discharge portion and two gathering and feeding portions, one extending laterally from each of opposite sides of the discharge portion whereby both lie along a long-wall mine face, the laterally extending portions, preferably, but not necessarily, being laterally flexible whereby they may be advanced laterally flexible toward the long wall-mine face and into material at the bottom thereof after it is removed from the mine face.

It is another object of the invention to provide an improved loader-conveyer apparatus including a discharge conveyor portion having improved means for driving a pair of conveyers adapted to gather and feed material to said discharge portion.

In carrying out the foregoing object it is a more specific object of the invention to provide an improved loader conveyer that includes an elongated extensible and contractible discharge portion over which there travels an endless conveyer driven from a head shaft adjacent the discharge end of the discharge portion, the endless conveyer driving a foot shaft and through clutch means a pair of gathering conveyer drive means that may be driven selectively either simultaneously or independently.

Other objects of the invention will appear hereinafter the novel features and combinations being set forth in the appended claims.

In the accompanying drawings:

Fig. 1 is a view in plan, with portions broken away, of a loader-conveyer embodying the features of the invention;

Fig. 2 is a view looking at the gathering end of the loader-conveyer seen in Fig. 1;

Figure 12:
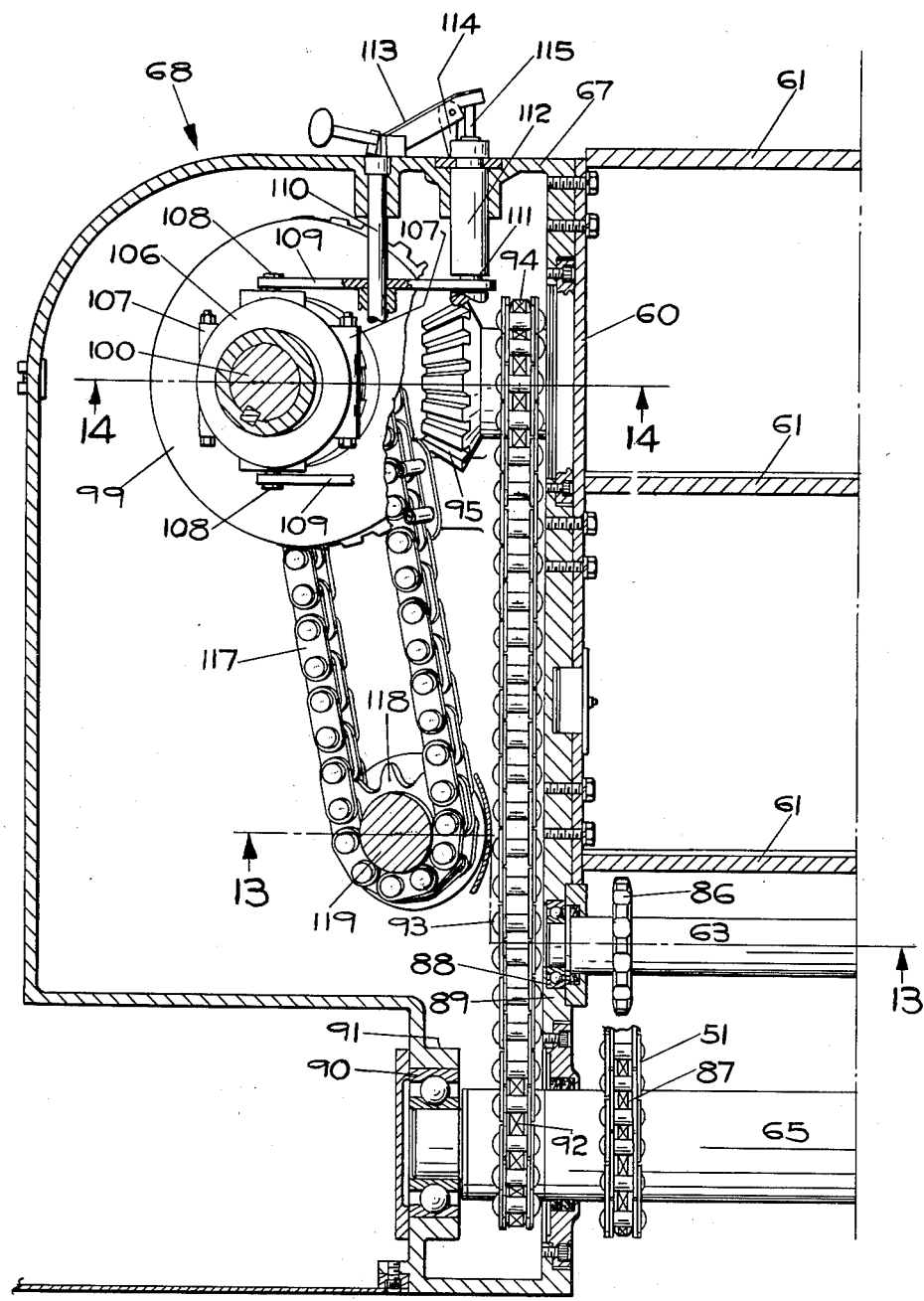

Figs. 3 and 3–a placed end to end constitute a view partly in section and partly in elevation of the discharge portion of the loader-conveyer seen in Fig. 1, the section being taken substantially on line 3—3 of Fig. 1;

Figs. 4 and 4–a placed end to end constitute a view in plan of the loader-conveyer seen in Fig. 3, with a fragment of each of the gathering and feeding conveyers only being shown;

Figs 5 through 9 are sectional views taken substantially on lines 5—5 through 9—9 of Figs. 3 and 3–a, respectively;

Fig. 10 is a plan view of adjacent end portions of adjacent main frame sections of one of the gathering and feeding conveyers of the apparatus, the view showing in dotted lines the mechanism by which the adjacent frame sections are pivotally connected together;

Fig. 10–a is a view in section, the section being taken substantially on line 10a—10a of Fig. 10;

Fig. 11 is a view in section, the section being taken substantially on line 11—11 of Fig. 10;

Fig. 12 is a view in section of one of the transmission mechanisms of the conveyer apparatus through which one of its gathering and feeding conveyers is driven;

Figs. 13 and 14 are views in section, the sections being taken substantially on lines 13—13 and 14—14 of Fig. 12, respectively;

Fig. 15 is a diagrammatic showing of a hydraulic system and apparatus of the conveyer; and Figs. 16 through 21 are diagrammatic illustrations indicating the operation of the loader-conveyer apparatus in a mine when the loader-conveyer is employed to gather and load coal removed from a long-wall mine face by a "planer" type mining machine.

In Fig. 1 of the drawings there is shown a loader-conveyer apparatus 30 that includes an elongated extensible and contractible discharge portion 31 and a pair of laterally flexible gathering and feeding portions 32 that extend laterally in opposite directions from opposite sides of the discharge portion at the material receiving end of the latter. The loader-conveyer apparatus 30 is a long-wall loader, that is, it is particularly designed to load coal removed from a coal face in a mine by a long-wall method of mining in which coal is removed from a long-wall coal face, for example, by a long-wall mining machine that traverses the face, or by undercutting, drilling and blasting etc. The operation of the conveyer apparatus is fully described hereinafter, but for the present it is deemed advisable to point out that during the operation of the loader-conveyer the gathering and feeding portions 32 which extend laterally from opposite sides of the extensible and contractible discharge portion 31 are adapted to lie along a long-wall coal face 33 of a mine and to be flexed or snaked laterally toward the coal face to gather and feed loose material removed therefrom to the discharge portion 31, which, in turn, carries the coal rearwardly, or away from the long-wall face, and discharges it into a conveyor or into mine cars, shuttle cars or other storage or coal carrying devices, not shown, from or by which it may be removed from the mine.

The construction of the main frame 34 of the discharge portion 31 of the loader-conveyor 30 is shown in Figs. 3 through 9 of the drawings. The main frame 34 of the discharge portion 31 is extensible and contractible and it includes a front or material receiving section 35 and a rear or material discharge section 36 that are movable longitudinally with respect to each other whereby the frame 34 may be expanded and contracted longitudinally. The rear frame section 36 includes a pair of bed or base channels 37 that have their top and bottom flanges 38 extending laterally outwardly and these channels 37 extend substantially throughout the length of the frame section 36. At the rear end of the frame section 36 and mounted upon the base channels 37 there are upwardly and horizontally extending frame members that form an elevated motor bed or platform 39 upon which an electric motor 40 is mounted as well as a short portion 41 of a guide for the return run of an endless chain scraper conveyor 42 that is described more fully hereinafter. Forwardly of the electric motor 40 the frame section 36 includes a pair of spaced channel members 43 (see Figs. 3a and 9) that are mitered and welded to the tops of the base channels 37. These members 43 slope upwardly, rearwardly to closely adjacent the front of the electric motor 40.

The bed or base channels 37 are spaced apart and rigidly interconnected by a plurality of cross-members, some of which are indicated at 44 in the drawings, and a bottom plate 45, all welded to and between the bed or base channels 37. Bottom plate 45 extends from adjacent the front of the bed or base channels 37 rearwardly to a point below that where the sloping channels 43 extend upwardly from the bed or base channels 37 and its rear edge or end is joined as by welding to a plate 46 (see Figs. 3–a and 9) that extends between and is welded to the sloping channels 43 and the bed or base channels 37. Plate 46 forms in effect an upwardly, rearwardly sloping continuation of the plate 45 and it extends to the front edge of the conveyor guide portion 41. In addition to the plate 46 the channels 43 are spaced apart by a plurality of cross-members, one of which is seen at 47 in Fig. 9 of the drawings. A portion of the return run of the endless conveyor 42 is carried in the channel formed by the spaced bed or spaced channel members 37 and the bottom plate 45 and the spaced channel members 43 and bottom plate 46. Extending horizontally above the bottom plate 45 between the bed or base channels 37 and lying upon cross-members 44 is another plate 48 which also carries a portion of the return run of the conveyor 42.

At the front end of the spaced bed or channels 37 there is a transversely extending shaft 49 (see Figs. 3 and 5), over which the endless scraper conveyer 42 travels. Shaft 49 carries spaced sprockets 50 which, in turn, carry the side chains 51 of the scraper conveyer 42 that are spaced apart by flights or scraper elements 52 attached therebetween. Shaft 49 is an idler shaft and it is carried by anti-friction bearings 53 mounted in blocks 54, one of which is rigidly attached to the front end of each of the bed or base channels 37.

The front or material receiving section 35 of main frame 34 includes a pair of channel members 55 having their top and bottom flanges 56 extending outwardly. Channel members 55 are spaced so as to extend longitudinally directly above the bed or base channels 37 (see Figs. 6 through 8) by a plurality of cross-members, some of which are indicated at 57 in the drawings. Between the channel members 55 there extends a plate 58 that rests upon the cross-members 57 and is welded along its side edges to the channel members 55. Plate 58 extends from the front of the channel members 55 to their rear ends, which, when the frame 34 is contracted (as shown in Figs. 3, 3–a and 4–a of the drawings), is adjacent the front of the sloping side channels 43. At their rear ends the channels 55 carry an idler shaft 59 (see Fig. 3–a) which for all practical purposes may be identical to the shaft 49 and it is carried by the channels 55 in the same manner that shaft 49 is carried by the bed or base channels 37.

Each channel 55 is connected at its front end to one of a pair of spaced upright plate members 60 (see Figs. 3, 12, 13 and 14) that are spaced apart by three angle members 61 upon which there rests a plate 62 that extends between the upright plate members 60 and forms a continuation of plate 58 that extends forwardly to adjacent an idler shaft 63. Spaced above the plate 62 there is another plate 64 that extends rearwardly from adjacent a conveyer foot shaft 65 and joins the bottom of an elongated trough or pan element 66, the sides of which extend rearwardly from housings 67 of transmission assemblies 68.

The rear or discharge frame section 36 carries a top trough 69 having a front trough or pan section 70 that extends from below the trough or pan 66 rearwardly to transition assemblies 71 through which its upwardly, outwardly sloping side walls 72 are faired into upright walls 73 carried by the sloping channels 43. These walls 73 at their rear ends are attached to the front end of the housing of motor 40. The transition assemblies 71 (see Figs. 4–a and 9) include bent side wall elements 74 that fair the sloping and straight walls 72 and 73, respectively, of the trough 69 together. These elements 74 are bolted directly to the tops of the sloping channels 43 and are each provided with laterally inwardly extending conveyer chain hold-down strips or guides 75 under which the side chains 51 of conveyer 42 travel. The bottom of the trough 69 throughout its sloping portion along the channels 43 is formed by plate means 76 that extends between the rests upon the tops of the channels 43 and extends between the transition assemblies 71 and is curved to fair into the bottom of the front pan section 70 of the trough 69. Pan element 66 rests in and slides on the pan section 70 when the main frame 34 is extended and contracted longitudinally as hereinafter described.

The motor 40 includes a pair of side by side armatures geared to drive a speed reducing gear mechanism, not shown, contained within a housing means that carries a conveyer head shaft 76' provided with conveyer drive sprockets 77 that mesh with and drive the endless side chains 51 of the conveyer 52. The housing members for the motor 40 and speed reducing gearing form a continuation of the top conveyer trough of the apparatus that extends from the rear of the trough 69 to and over the head shaft 76' over which material being conveyed by the conveyer 42 is spilled or discharged. These housing elements also form in their bottoms a portion of the conveyer guide section 41.

The channels 55 of the front or material receiving frame section 35 are supported above the bed or base channels 37 by a pair of brackets 78 mounted rigidly to and extending upwardly from the front ends of the bed or base channels 37 (see Figs. 3 and 6) and by a pair of brackets 79 mounted rigidly and extending downwardly from the rear ends of the channels 55 (see Figs. 3–a and 8). The four brackets 78 and 79 are identical in construction and therefore a description of one of the brackets 78, seen in Fig. 6 of the drawings, suffices to describe all four of the brackets. Each bracket 78 includes a base portion 80 that fits and is wedged between the top and bottom flanges 38 of a channel member 37 and it is secured thereto by bolts, one of which is indicated at 81 in the drawings. The bracket 78 includes a leg 82 that is integral with the base 80 and which extends laterally outwardly, then upwardly. Leg 82 carries two rollers 83 and 84. The bottom flange 56 of channel 55 rides upon the roller 83 and roller 84 extends into the channel 35 between its top and bottom flanges 56. The brackets 79 are identical to brackets 78, but their bases 80 are mounted to the channel members 55 and rollers 83 and 84 cooperate with the bed or base channels 37.

From the description of the discharge portion 31 of the loader-conveyer 30 thus far given, it will be apparent that the loader-conveyer 42 is driven by the motor 40 through the head shaft 76' and sprockets 77 and from the head shaft sprockets 77 the conveyer 42 in its return run to the foot shaft 65 travels below the motor of the housing 40 through the portion 41, the passage formed between the sloping channel members 42 and the bed or base channel members 37 to the idler shaft 49 carried by the bed or base channel members 37. It is pointed out here that where the endless conveyer 42 passes from the sloped channel portion between the sloping channel members 43 to the horizontal channel between the bed or base channel members 37 that its side chains 51 pass below hold-down strips or guides 85 similar to the hold-down strips or guides 75. From the idler shaft 49 the conveyer 42 passes over the plate 48 and travels to the idler shaft 59 carried by the rear ends of the channel members 55. After traveling around idler shaft 59 the conveyer 42 travels forwardly over plates 58 and 62 to idler shaft 63 to reach the foot shaft 65. Upon traveling around the foot shaft 65 conveyer 42 begins to travel along its working run over plate 64, pan 66, trough 69 and the housing of motor 40 to the foot shaft sprockets 77. Because the head shaft 76' and its sprockets 77 and idler shaft 49 are carried by the rear or material discharge frame section 36 and the foot shaft 65 and idler shaft 59 are carried by the front or material receiving section 35 the length of the conveyer 42 will remain constant regardless of the positions of the frame sections 35 and 36 of main frame 34 with respect to each other. The mechanism for extending and contracting the frame 34 is described hereinafter in connection with the hydraulic system of the loader conveyer 30.

The transmissions 68 are identical but of opposite hand, and therefore a description of one describes the other. Referring particularly to Figs. 3, 12 and 13 of the drawings it will be seen that the endless chains 51 of the conveyer 42 travel over sprockets 86 and the idler shaft 63 and then around sprockets 87 keyed to the foot shaft 65 to drive both of the shafts 63 and 65. Idler shaft 63 is carried at each of its ends by an anti-friction bearing 88 secured within an opening formed in the wall 89 of the transmission housing 67 that is bolted to the side wall or plate 60 of the front or receiving frame section 35 of main frame 34. Foot shaft 65 extends into the transmission housing 67 and is carried at each of its ends by an anti-friction bearing 90 mounted in a cup 91 formed in another wall of the housing 67. The end of the foot shaft 65 within the transmission housing is provided with a sprocket 92 that drives a roller chain 93, which, in turn, drives a sprocket 94 of a pinion gear 95 mounted through anti-friction bearings 96 and 97 on a stub shaft 98 carried by the wall 89 of the transmission housing 67. Pinion 95 is in constant mesh with and drives a large bevel gear 99 that is mounted for free rotation on an upwardly, outwardly extending shaft 100. Shaft 100 is mounted on anti-friction bearings 101 and 102 contained respectively in a cup 103 formed integral with the bottom wall of transmission housing 67 and a cup 104 formed in a removable top cover 105 of the housing 67. Above the bevel gear 99 and axially movably along, but keyed to drive the shaft 100 is a clutch element 106 that is provided with ears or lugs adapted to interfit with ears or lugs on the top of bevel gear 99. Clutch element 106 carries a shipper collar 107 provided with oppositely, outwardly extending bosses 108. Bosses 108 are received by ends of a pair of side members 109 of a shipper that is pivoted on a shaft 110 carried by the transmission housing 67. The other ends of the arms 109 opposite the bosses 108 are bifurcated and engage eccentrics 111 of a rotatable shaft 112, one end of which extends through and is supported by a wall of the transmission housing 67. Shaft 112 is rotated to engage and disengage the clutch formed by the gear 99 and element 106 by a manually controlled handle 113 pivoted to a bracket 114, of the shaft 112 and urged to engage stop or latch lugs on the housing 67 by a spring pressed plunger 115.

The bottom of shaft 100 above bearing 101 carries a sprocket 116 (see Fig. 14) that drives a chain 117 extending forwardly in the housing 67 to a sprocket 118 (see Fig. 13) on a shaft 119. Shaft 119, like shaft 100, extends upwardly and laterally outwardly with respect to the discharge portion 31 of the loader-conveyer 30 and it is carried by anti-friction bearings 120 and 121. Bearing 120 is carried in a cup formed integral with the bottom wall of transmission housing 67 and bearing 121 is contained within a collar and lubricant retainer assembly 122 that surrounds the shaft 119 and is carried by a sloping top wall of the transmission housing 67. At its upper end shaft 119 carries a pocket type sprocket 123 that drives the endless chain 124 of one of the gathering and feeder portions 32. It will be seen that the foot shaft 65 which is driven by the conveyer 42 from the motor 40 at the discharge end of the discharge portion 31 is the power input shaft of both of the transmission assemblies 68 and that through each of the transmission assemblies 68 the shaft 65 is connected to drive the chains 124 of the gathering portions 32 through sprockets 123.

Each gathering and feeding portion 32 of the loader conveyer 30 includes a built-up inner end frame assembly 125 that is rigidly attached to one of the transmission assemblies 68 and extends laterally outwardly therefrom, a built-up end frame assembly 126 and a plurality of built-up intermediate frame assemblies 127, the number of which may be varied to vary the total length of each of the gathering and feeding portions 32.

Each of the inner frame assemblies 125 is curved, as seen in Fig. 2 of the drawings, so that its inner end, which is attached to the housing 67 of transmission 68, extends in a plane perpendicular to the axis of the transmission shaft 119 and so that its outer end extends in a horizontal plane. To the outer end of each of the inner end frame assemblies 125 there is pivotally attached one end of a series of intermediate frame assemblies 127 which are also pivotally connected together and to an outer end frame assembly 126. Each of the frame assemblies 125, 126 and 127 carries a conveyer chain guide means, a cross sectional view of one of which is seen in Fig. 11 of the drawings, in which the endless chain 124 which carries flights 128 circulates. The path of travel of each of the chains 124 is indicated in dot-dash lines in Fig. 1 of the drawings and on each gathering portion 32 the path and direction of travel of the endless chain 124 is along the front of the laterally flexible gathering and feeding portion 32 toward the drive sprocket 123. From the drive sprocket 123 the chain 124 travels along the rear of the laterally flexible portion 32 to an idler wheel 129 on the outer end frame assembly 126 about which it reverses its direction of travel to again enter the front or working run along the front of the flexible portion 32.

A view in plan of adjacent ends of the identical intermediate frame assemblies 127 is seen in Fig. 10 of the drawings and views in section taken through the pivotal apparatus connecting these frames 127 are seen in Figs. 10–a and 11. Except for features hereinafter specifically pointed out, the general plan of each section 127 is also carried out in both the inner and outer end frame assemblies 125 and 126, respectively.

Referring now particularly to Figs. 10 and 11 of the drawings each intermediate frame assembly 127 includes an elongated base or bottom plate 130, the front edge 131 of which is bent downwardly to scrape the mine floor and to slide under coal on the mine floor as the frame is advanced laterally over the floor. Plate 130 is reinforced at intervals throughout its length by floor engaging wear strips or skids 132 having an upwardly extending ear 133 against which an angle member 134 abuts and through which jacks for moving the portion 32 bodily laterally may be carried. Angle member 134 extends substantially throughout the length of the base of bottom plate 130 and it is welded to both it and the ears 133. A bar 135 that extends longitudinally along the top of the base or bottom plate 130, and is welded thereto, carries a sheet metal strip 136 that is deformed to provide the lower half of the guide means for the chain 124. A second bar 137 extends longitudinally above the bar 135 and rests upon the center portion of the deformed strip 136. Upon the top of bar 137 there is a second deformed strip 138 similar to strip 136, but inverted to form the top half of the guide means for the chain 124. A deformed plate 139 that extends longitudinally along the top of the plate 137 forms a flight guide against which the flights 128 lean and ride as they travel along the back or non-loading side of the frame assemblies 127, as seen in Fig. 11 of the drawings. The strips 136, 138, 139 and the bar 137 are secured to the bottom bar 135 by a plurality of cap screws 140 (Fig. 10) that extend through them and are threaded into the bottom bar 135. At one end of each frame assembly 127 the bottom bar 135 extends beyond the end of the base or bottom plate 130 and the end of the top bar 137 above the extending bar 135 terminates short of the end plate 130 (see Fig. 10–a).

That portion 141 of the bottom bar 135 that extends beyond the end of plate 130 is drilled to receive a pivot pin 142. When two frame assemblies 127 are connected as seen in Figs. 10 and 10-a of the drawings, the extending end portion 143 of the top bar 137 overlaps the extending end portion 141 of the bottom bar 135 and a pin 142 is inserted in the aligned openings in the extending or overlapping portions 141 and 143 to connect pivotally the adjacent frame assemblies 127.

The adjacent intermediate frame assemblies 127 may pivot with respect to each other about the vertical axis of each pin 142 through an angle of approximately five degrees and each gap between the adjacent ends of bottom plate 130 is closed by a plate 144 welded to the bottom of one of the plates 130 that slides under the adjacent plate 130. The flights 128 of the endless conveyer are of such width that they will span the gaps between the adjacent ends of the plates 130 as they pass across them and therefore will not catch on the ends of plates 130 regardless of the angular relation of the adjacent frames 127 with respect to each other. Flights 128 are spaced along the endless conveyor chain 124 and each is attached to a pair of wings 145 of a link of said chain 124 by a bolt 146 that extends through spaced ears or lugs 147 of the flights 128 and the wings 145. The flights 128 lie in a generally horizontal plane and ride the base plates 130 along the front of each gathering and feeder conveyer portion 32 of the apparatus where they convey material to the discharge portion 41. As the flights 128 travel around the drive sprocket or wheel 123 they ride over an inclined curved elevator bar 147 that elevates, rotates or raises them to generally upright positions. As the flights begin to travel along the backs of the gathering and feeding portions 32 they are tilted, as seen in Fig. 11 of the drawings, so as to lean upon and slide along the flight guides 139. Upon passing around the idler wheel 129 on end frame 126 the flights 128 are swung to ride over the base plates 130 upon which they slide during their travel to the drive wheel or sprocket 123.

Suitable guard means covers the path of travel of flights 128 between the head or drive sprocket 123 of the transmission assembly 168 and the idler wheel or sprocket 129. The guard means of each frame assembly 125, 126 and 127 is constructed in accordance with the general plan shown in Fig. 11 wherein each intermediate frame assembly 127 carries a cover formed by front and rear upstanding elongated deformed plates 148 and 149, respectively. Plate 149 is bolted along its bottom edge to the angle 134 and it carries through suitable brackets, a plurality of rollers 150 that support an electric conductor cable indicated at 151 that conducts electric current to a mining machine (see Figs. 16 through 21) that travels across and removes material from the mine face 33 as hereinafter described. The front cover plate 148 is bolted along its top edge to the horizontal top of plate 149 and it extends downwardly to adjacent the top of the upper deformed chain guide strip 138 to form a wall against and along which coal being conveyed by the flights 128 slides. The spaces or gaps between the adjacent ends of the front plates 148 on adjacent frame sections 127 are closed by plates 152 welded to one plate 148 and extending behind the adjacent plate 148.

The discharge portion 31 of the loader-conveyor 30 is extended and contracted by a hydraulic motor connected in a hydraulic system illustrated diagrammatically in Fig. 15 of the drawings. There are two identical single acting piston and cylinder type hydraulic motors 153 spaced one on each side of the frame section 36 (see Fig. 4). The cylinder 154 of each of these motors 153 is rigidly attached to one side of the bed or base channels 37 of the discharge sections 36 by spaced brackets indicated at 155 in Figs. 4 and 7 of the drawings. The piston rod means 156 of each of these motors 153 is adapted to reciprocate longitudinally along one side of the base channels 37 and its outer or free end carries a sheave 157. A cable 158 that operates over sheave 157 has one of its ends affixed to a bracket 159 on the cylinder 154 and the other end of the cable 158 is affixed to an ear or lug 160 on one of the brackets 79 that supports the rear end of one of the channel members 55 of the material receiving section frame 35 (see Fig. 3-a). The sheave 157 and piston rod means 156 are protected by covers 161. The piston means 156 of each of the motors 153 has a stroke of 6 ft., but because one end of each of the cables 158 is attached to a cylinder 154 of a motor 153 and the other end of each of the cables 158 is attached to the front or receiving frame section 35 through one of the brackets 79, the frame 35 will be moved or extended rectilinearly from its contracted position, as seen in Figs. 3, 3-a, 4 and 4-a of the drawings, through a distance of 12 ft., when the motor 153 is expanded.

At the rear end at one side of the discharge frame section 36 there is another single acting piston motor 162 that is identical in construction to that of the motors 153 and the cylinder 163 of which is mounted to one of the channel members 37. The piston rod means 164 of motor 162 is adapted to be extended rearwardly or in a direction opposite to that in which the piston rod means 156 of motors 153 are extended. Piston rod means 164 carries a sheave 165 over which there operates a cable 166, one end of which is attached to a bracket 167 on the motor cylinder 163 and the other end of which is looped as indicated at 168 and placed over a stake 169 driven or set in the mine floor.

The hydraulic circuit, in which the piston motors 153 and 162 are connected includes a tank 170 for hydraulic fluid, such as oil, from which hydraulic fluid is withdrawn by a pump 171 through a conduit 172. From pump 171 the hydraulic fluid is fed through a conduit 173 to a reversing valve 174, of well-known construction, which has a central axially movable core or spool 175. When the core or spool is in its central or neutral position, as shown, the hydraulic fluid flowing thereto from pump 171 through conduit 173 enters the valve body and flows through ports 176 therein to an outlet conduit 177 through which the hydraulic fluid is returned to the tank 170. In other words, when the core or spool 175 is in the position shown, valve 174 directs the output of hydraulic fluid from the pump 171 to the tank 170.

When the core or spool 175 is shifted downwardly, as seen in Fig. 15 of the drawings, a land 178 of spool 175 is shifted to permit the fluid supplied by pump 171 to flow through a port 179 in the valve body to a conduit 180 that is bifurcated to lead to both motors 153. It will be seen from Fig. 15 of the drawings, that when the core or spool 175 is shifted downwardly, as above described, to direct hydraulic fluid to the motors 153 that a central land 181 of the spool 175 closes the lower port 176 and that a land 182 is shifted to close the upper port 176 thus isolating the conduit 177 from conduit 173 and connecting the conduit 180 to the conduit 173. Land 182 of spool 175 is of such length that when it is moved downwardly, as described, it opens a port 183 and connects a conduit 184, that leads to motor 162, to a conduit 185, that leads to the tank or reservoir 170. When the core or spool 175 is shifted upwardly, as seen in Fig. 15 of the drawings, the connections of the conduit 180 and 184 are reversed with respect to the supply conduit 173 and the conduit 180 is connected to a drain conduit 186 that leads to tank 170. Valve 174 includes a suitable spring centering mechanism 187 that normally retains the core or spool 175 in its neutral or by-passing position, as shown in Fig. 15 of the drawings. Valve 174 may be operated from either side of the discharge portion 31 by means of operating tubes indicated generally at 188.

From the foregoing description it will be seen that when the core or spool 175 of valve 174 is moved downwardly, as seen in Fig. 15 of the drawings, that hydraulic fluid under pressure will be delivered to the motors 153 to expand them and to extend the length of the discharge portion 31 and that when the core or spool 175 is so shifted, the motor 162 is connected to drain so that it can be contracted and that when the core or spool 175 is shifted upwardly, that the motor 162 is connected to receive hydraulic fluid under pressure and that it will expand while motors 154 are connected to drain so that they may be contracted.

The discharge portion 31 is expansible and contractible so that its forward or receiving section 35 may be advanced progressively to follow the mine face as it is worked and so that the discharge section may be made to crawl along the mine floor to reposition the discharge frame 36 when the limit of expansion of the discharge portion 31 is reached.

In the beginning the operation of the conveyer apparatus 30 to gather and load coal in a mine the discharge portion 31 is contracted, as shown in the drawings, and it is anchored to the mine as by mine jacks, stells or the like, not shown, and the motor 162 is contracted so that cable 166 may be stretched and stelled to the mine floor by the stake 169. When it becomes desirable to extend the discharge portion 31 the conveyer apparatus to cause it to progress with or advance toward the coal face 33 the core or spool 175 of valve 174 is shifted downwardly, as seen in Fig. 15 of the drawings, to direct hydraulic fluid from pump 171 to the motors 153, which acting through the cables 158 on sheaves 157 cause the frame section 35 to move longitudinally with respect to frame section 36 to extend the discharge portion 31.

After the discharge portion 31 is fully extended, as above described, it is contracted in a manner so that its rear or discharge frame section 36 moves with respect to its front or receiving frame section 35. This is accomplished by anchoring the front end of the front or receiving section frame 35 to the mine as by roof jacks or the like, not shown, that are fitted in brackets 189 (see Fig. 4), by removing the anchoring devices for the rear frame section 36 and by shifting the core or spool 175 of valve 174 upwardly to connect motor 162 with the pump 171 and to connect motors 153 to the tank 170. Motor 162 upon expanding acts through cable 166 to contract the discharge portion 131 and the motors 153.

Below the motor 40 of the conveyer apparatus there is a hand operated winch 190 (Fig. 3-a) having a cable 191 attached to the free end of the piston rod means 164 of motor 162. This winch apparatus is employed to contract the motor 162 so that the stake 169 may be moved and the cable 166 again placed over it.

Figs. 16 through 21 of the drawings illustrate diagrammatically the loader-conveyer apparatus 30 working to gather and load coal in a mine that is being worked out by a long-wall mining machine 191 of a "planer" type. The operation of the loader-conveyer 30 will best be understood by describing the mining operation as comprising a series of steps illustrated in Figs. 16 through 21 of the drawings, which series of steps is repeated each time the last step thereof has been completed.

Referring first to Fig. 16 of the drawings, the loader-conveyer apparatus 30 is shown diagrammatically in a mine with its discharge portion 31 extending into a mine passageway or gate 192 formed between two pillars 193. There are a number of pillars 193, the function of which is to support the mine roof. These pillars 193 are constructed as mining progresses to advance and follow the mine face as it is worked away. There is also present in the mine a number of temporary roof supports or cribs 194 that are placed, for the sake of safety, at various positions adjacent the mine face 33.

The gathering portions 32 of the loader-conveyer 30 extend laterally from opposite sides of the material receiving end of the discharge portion 31 of the loader-conveyer apparatus 30 and lie along and adjacent the coal face 33. These gathering portions 32 are laterally flexible in order that they may be advanced flexible laterally or "snaked" by a plurality of mine jacks 195 to follow the mine face as it advances or is worked away.

The mining machine 191 illustrated diagrammatically in Figs. 16 through 21 of the drawings is of the "plow" or "planer" type, that is, as it traverses the mine face 33 it plows, planes or chisels therefrom a slice of coal and breaks the coal into lumps as it removes it from the mine face.

The mining machine 191 shown is a double ended coal cutting machine, that is, it is provided at each of its opposite ends with identical coal removing mechanisms in order that it can remove coal from the mine face 33 as it travels first in one direction and then in the other across the mine face. In the drawings certain of the elements of the coal cutting apparatus on one or the other end of the machine 191 have been omitted to show other coal removing elements located therebelow.

Mining machine 191 propels itself across the mine face 33 along a long chain 196 that is stelled or anchored to the mine at opposite ends adjacent opposite ends of the mine face 33 by a roof jack and chain tightening device indicated generally at 197. Each of the coal removing mechanisms on the opposite ends of the machine 191 includes identical top and bottom kerf cutter bar assemblies 198 about which there circulates an endless kerf cutter chain provided with the usual cutter bits. The cutter bars 198 are mounted to swing in a horizontal plane about a vertical axis so that they may be swung to cut top and bottom kerfs into the coal face 33 as the machine 191 travels across it. Between the top and bottom kerf cutter bar 198 there is a wedge shaped plow, cutter blade or chisel 199 that is vibrated vertically and is adjustable pivotally about a vertical axis in order that it may be adjusted to plow, plane, slice or chisel coal from the mine face 33 as the machine 191 traverses the face 33. Machine 191 also includes a fender, runner, slide or guide element 200 (Fig. 20) that bears against and rides over aligned upright posts or guide elements 201 of the face props or jacks 195 arranged with respect to the mine face 33 so that the upright guide elements or posts 201 guide properly the cutting machine 191 along the face 33 as it traverses and removes coal from it.

In Fig. 16 of the drawings the cutting machine 191 is shown as it makes a first cut across the face 33. During this cut upright face props 201 of jacks 195 are aligned to guide the cutting machine 191, through the runner 200, in a straight line across the face 33 and the gathering and feeding portions 32 of the loader-conveyer 30 are positioned immediately in front of the upright guide elements or posts 201 of props or jacks 195 and lie parallel to the straight mine face 33. It may be mentioned that while the cutting machine 191 is making the cut illustrated in Fig. 16 of the drawings the kerf cutter bars 198 cut top and bottom kerfs in the face 33 and that the plow or cutter blade 191 which is being vibrated vertically, plows, slices, planes or chisels the coal from that portion of the face 33 that lies between the top and bottom kerf cutter elements 198. Coal which is removed from the face 33 falls therefrom and for the most part it is plowed or scraped on to one of the gathering and feeding portions 32 by the cutter blade or chisel 199 and the gathering and feeding portion 32 of loader-conveyer 30 then scrapes and feeds the coal to the receiving end of the discharge portion 31 of loader-conveyer 30 which in turn feeds the coal to a mine conveyer 203 (see Fig. 19) which may convey the coal from the mine. The above described cut is completed when the cutting machine 191 reaches the end of the face 33.

In order to begin the next cut across the mine face 33 (see Figs. 18 and 19), the cutting machine 191 is caused to perform a stabling or sumping cut as illustrated in Fig. 17 of the drawings. To make this cut the cutting machine 191 is backed along the chain 196 and away from the end of the coal face 33. Its top and bottom cutter bars 198 and the plow, cutter blade, or chisel 199 facing the adjacent end of the coal face 33 are slewed or adjusted to remove from the coal face 33 another slice 204 of coal as the cutting machine is again caused to move toward the adjacent end of the coal face 33. When the cutting machine 191 reaches the end of the coal face 33 its cutter bars 198 and cutter blade 199 adjacent the end of the face are adjusted to lie generally parallel with the coal face 33 (Fig. 18).

The kerf cutter bars 198 and the cutter blade 199 on the opposite end of the machine 191 are then slewed or adjusted into engagement with the mine face 33 so that they will cut along it as the mining machine 191 is caused to propel itself along the chain 196 toward the other end of the coal face 33 (Fig. 19).

As the mining machine 191 moves across the coal face 33 towards its other end that portion of the gathering and feeding portion 32 of loader-conveyer 30 which is behind the machine is flexed or "snaked" laterally forwardly or toward the face 33 by the jacks 195, and their roof props 201 are advanced toward the mine face 33 to position them to guide the mining machine 191 along the mine face 33 on its return trip or traverse across the face 33.

After the mining machine 191 passes the receiving end of the discharge portion 31 of loader-conveyer 30 the gathering and feeding portion 32 from in front of which the machine 191 has passed need no longer be driven and its operation may be stopped by disconnecting it from the foot shaft 65 by disengaging the clutch formed by the bevel gear 99 and clutch element 106 in its transmission 63. In other words, when a portion 32 of the loader-conveyer 30 is not gathering and feeding coal to the discharge portion 31 it may be disconnected from the foot shaft 65 by its clutch so that it will not be driven. After the mining machine passes the receiving end of the discharge portion 31 of the loader-conveyer apparatus 30 the discharge portion 31 is expanded, as hereinbefore described, to cause its receiving end to advance toward the mine face 33.

Fig. 19 of the drawings shows the second traverse cut above described nearing completion and when the cutting machine reaches the end of face 33 the second traverse cut is completed. In order for the machine 191 to traverse the face 33 in the opposite direction it must first perform another stabling or sumping cut. The operation of machine 191 in making this stabling or sumping cut is identical to that described in connection with Fig. 17 of the drawings but, of course, it is made at the opposite end of the face 33. There is one difference, however, in making this second stabling or sumping cut that is here pointed out. The runner member 200 of the cutting machine 191 is extensible with respect to the body of the machine 191 by a plurality of hydraulic jacks 205 (Fig. 20) which are expanded to cause the machine 191 to advance or move bodily toward the coal face 33 while riding upon the unmoved posts or guide elements 201 of the jacks 195 in order that its cutter elements 198 and 199 may be adjusted to make the second sumping cut.

After the second stabling or sumping cut (Fig. 20) is completed the jacks 205 are contracted to move the runner 200 toward the machine 191. The portion 32 of the loader-conveyer 30 adjacent the machine 191 is then advanced toward the mine face 33, the roof props or jacks 201 are reset and the mining machine is caused to traverse the face 33, as shown in Fig. 21, in the manner described in connection with Fig. 16 of the drawings. During this cut the gathering and feeding portions 32 of loader-conveyer apparatus 30 are not advanced toward the mine face 33 and when the machine 191 reaches the end of mine face 33 it is again caused to perform the stabling or sumping operation indicated in Fig. 17, after which it is caused to traverse the mine face 33, as shown in Figs. 18 and 19 of the drawings.

From the foregoing it will be readily apparent that I have provided an improved loader-conveyer that includes an extensible and contractible discharge portion capable of creeping or crawling over the mine floor to follow a mine face as it is worked away and that the loader includes a pair of laterally flexible elongated gathering and feeding portions that extend in opposite directions from the receiving end of the discharge portion so that they may lie adjacent a mine face to gather and convey coal removed therefrom to the extensible and contractible discharge portion of the loader-conveyer apparatus. It will also be apparent that the laterally oppositely extending gathering and loading portions of the apparatus may be flexed laterally to follow the mine face as it is worked away and so that it may be positioned properly to remove coal cut from the mine face upon the next pass of a coal cutting machine across the face. It will, beyond the foregoing, also be apparent that the improved loader-conveyer which I have provided includes clutch means through which its oppositely laterally extending gathering and feeding portions are driven and by which these gathering and feeding portions may be operated selectively either simultaneously or individually.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. Mine conveyer apparatus adapted to load coal removed from a long wall mine face including an endless chain conveyer mounted on an extensible and contractible frame means having a relatively fixed discharge end and having a receiving end which is movable longitudinally with respect to said discharge end toward the mine face, power means for extending said frame means to feed the receiving end of said conveyer longitudinally toward the mine face and away from said discharge end, a motor supported on the discharge end of said frame means connected to a head shaft which provides for driving said chain conveyer from a relatively fixed position, a foot shaft driven by said chain conveyer, a pair of power transmission means supported by said frame means and movable therewith one of said pair on each side of the receiving end of said chain conveyer and including sprockets driven from said foot shaft, a pair of endless gathering and feeding chain conveyers including a plurality of pivotally connected sections movable with said frame means and over which the flights of said gathering and feeding conveyers extend and which extend laterally at right angles one of said pair on each side of the receiving end of the first said chain conveyer whereby said sections can be flexed to provide for maintaining the gathering and feeding conveyers substantially parallel to the mine face and in position to gather coal removed from the mine face as the mining progresses and discharge said coal onto the receiving end of the first said conveyer, said gathering and feeding conveyers being driven from said sprockets in the power transmission means and being movable with the receiving end of the first said conveyer without requiring the discharge end and motor of the first said conveyer to be moved.

2. Mine conveyer apparatus adapted to load coal removed from a long wall mine face including an endless chain conveyer mounted on an extensible and contractible frame means having a relatively fixed discharge end and having a receiving end which is movable longitudinally with respect to said discharge end toward the mine face, power means for extending said frame means to feed the receiving end of said conveyer longitudinally toward the mine face and away from said discharge end, a motor supported on the discharge end of said frame means connected to a head shaft which provides for driving said chain conveyer from a relatively fixed position, a foot shaft driven by said chain conveyer, a pair of power transmission means supported by said frame means and movable therewith one of said pair on each side of the receiving end of said chain conveyer and driven from said foot shaft, a pair of endless gathering and feeding chain conveyers including a plurality of pivotally connected sections movable with said frame means and over which the flights of said gathering and feeding conveyers extend and which extend laterally at right angles one of said pair on each side of the receiving end of the first said chain conveyer whereby said sections can be flexed to provide for maintaining the gathering and feeding conveyers substantially parallel to the mine face and in position to gather coal removed from the mine face as the mining progresses and discharge said coal onto the receiving end of the first said conveyer, said gathering and feeding conveyers being driven from said power transmission means and being movable with the receiving end of the first said conveyer without requiring the discharge end and motor of the first said conveyer to be moved.

References Cited in the file of this patent

UNITED STATES PATENTS

| Number | Name | Date |
|---|---|---|
| 875,385 | Smith | Dec. 31, 1907 |
| 1,425,556 | Tingwall et al. | Aug. 15, 1922 |
| 1,450,603 | Morgan | Apr. 3, 1923 |
| 1,659,316 | Enney | Feb. 14, 1928 |
| 1,821,438 | Levin | Sept. 1, 1931 |
| 2,358,849 | Cartlidge | Sept. 26, 1944 |
| 2,588,283 | Osgood | Mar. 4, 1952 |
| 2,630,902 | Bigelow | Mar. 10, 1953 |